United States Patent [19]

Yasuda et al.

[11] Patent Number: 4,713,709
[45] Date of Patent: Dec. 15, 1987

[54] TWIN HEAD FOR ELECTRONIC STILL CAMERA AND A METHOD FOR MAKING THE SAME

[75] Inventors: Isao Yasuda, Katano; Yorinobu Yoshisato, Hirakata; Hideki Yoshikawa, Osaka; Kazuhiko Taketa, Hirakata, all of Japan

[73] Assignee: Sanyo Electric Co., Ltd., Osaka, Japan

[21] Appl. No.: 760,796

[22] Filed: Jul. 31, 1985

[30] Foreign Application Priority Data

Aug. 7, 1984 [JP] Japan .................. 59-165314

[51] Int. Cl.⁴ .................. G11B 5/255; G11B 5/29
[52] U.S. Cl. .................. 360/121; 360/122
[58] Field of Search .................. 360/121, 122

[56] References Cited

U.S. PATENT DOCUMENTS

| | | | |
|---|---|---|---|
| 4,291,352 | 9/1981 | Gooch | 360/122 |
| 4,475,137 | 10/1984 | Yasuda et al. | 360/126 |
| 4,590,530 | 5/1986 | Sakakima et al. | 360/122 |

FOREIGN PATENT DOCUMENTS

| | | |
|---|---|---|
| 1474428 | 3/1969 | Fed. Rep. of Germany . |
| 3103767 | 12/1981 | Fed. Rep. of Germany . |
| 0029831 | 3/1981 | Japan .................. 360/121 |
| 58-80126 | 8/1983 | Japan . |
| 59-121620 | 11/1984 | Japan . |
| 60-147912 | 12/1985 | Japan . |
| 2044510 | 3/1980 | United Kingdom . |

*Primary Examiner*—Robert S. Tupper
*Attorney, Agent, or Firm*—Armstrong, Nikaido, Marmelstein & Kubovcik

[57] ABSTRACT

A twin head for use in an electronic still camera includes a shield plate, first and second head chips bonded on opposite sides of the shield plate, and first and second reinforcing core members further bonded on first and second head chips, respectively. Each of the first and second head chip members has an elongated face that faces a recording medium and a magnetic gap defined at an intermediate portion of the elongated face. The length Wh of the elongated face is between 0.3 millimeter and 1 millimeter. Each of the first and second reinforcing core members has a coil wound thereon. The first and second head chip members, the shield plate, and the first and second reinforcing core members are bonded together such that the elongated faces of the first and second head chip members are in flush with each other and that the magnetic gaps of the first and second head chip members are aligned to each other.

8 Claims, 14 Drawing Figures

TWIN HEAD FOR ELECTRONIC STILL CAMERA AND A METHOD FOR MAKING THE SAME

BACKGROUND OF THE INVENTION

1. Field of the invention

The present invention relates to an electronic still camera and, more particularly, to a twin head having two magnetic heads arranged side-by-side for recording and/or reproducing picture signal on a recording medium. The present invention alos relates to a mehtod for making such a twin head.

2. Description of the Prior Art

An electronic still camera uses a small size disc which has a plurality of tracks defined therein. One example of such a disc has a diameter of 2 inches and 50 coaxial tracks are formed on the disc. The disc is diagrammatically shown in FIG. 1. According to one standard, the tracks are very narrow such that the width of the track is 60 micrometers and the spacing between the tracks is 40 micrometers. The recording of one picture on the disc is effected either by using one track (field recording system) or two tracks (frame recording system). The present invention is particularly concerned with the frame recording system using two tracks for recording one picture.

In the frame recording system, which is also called a frame recording/reproducing system, a recording head of a twin head type is used. The recording head of twin head type is defined by two magnetic heads aligned side-by-side with a spacing of 40 micrometers and each magnetic head has the thickness of 60 micrometers.

For recording a picture on the disc, the disc makes one complete turn so as to record the picture signal on two neighboring tracks simultaneously. For reproducing the picture on a CRT, the picture signal recorded on one track is used for scanning odd lines and the picture signal recorded on the other track is used for scanning even lines.

A recording head having two magnetic heads aligned side-by-side is already known in the prior art, such as disclosed in Japanese Patent Publication (examined) No. 2647/1980 published Jan. 21, 1980. However, as disclosed in this Japanese Patent Publication No. 2647/1980, the prior art recording head with two magnetic heads is for the audio appliances or the like, and not for the electronic still camera. Also, the prior art recording head employs a non-magnetic plate sandwiched between two magnetic heads for the purpose of not only to separate the two heads but also to preventing the magnetic heads from the abrasion. This also implies that the prior art magnetic head of Japanese Patent Publication No. 2647/1980 is not for the electronic still camera.

Furthermore, unlike the recording heads used in the audio appliances or in video tape recorders, the recording head for the electronic still camera is very small. For example, the spacing between the two magnetic heads for the audio appliances is about a several hundred micrometers, whereas that of the twin head for the electronic still camera is 40 micrometers.

Thus, the two magnetic heads of twin head are positioned so close to each other that there arises a problem of a crosstalk between the two magnetic heads. The crosstalk is particularly outstanding between the faces of the magnetic heads whichf ace the recording medium, i.e., the disc. As will be apparent from the description of the preferred embodiment, such a crosstalk can be suppressed by narrowing the width (which is in the direction parallel to the track tracing direction of the head) of the head chip.

The narrowing of the head chip width brings about another problem of difficulty in manufacturing such a small size recording head in a high accuracy particularly in its widthwise direction.

SUMMARY OF THE INVENTION

The present invention has been developed with a view to substantially solving the above described disadvantages and has for its essential object to provide a twin head for the electronic still caamera which has less crosstalk between the two magnetic heads.

It is also an essential object of the present invention to present a method for making the twin head of the above described type with a high accuracy.

In accomplishing these and other objects, a twin head for the elctronic still camera according to the present invention comprises a shield plate, first and second head chips bonded on opposite sides of the shield plate, and first and second reinforcing core members further bonded on first and second head chips, respectively. Each of the first and second head chip members has an elongated face that faces a recording medium and a magnetic gap defined at an intermediate portion of the elongated face. The length Wh of the elongated face is between 0.3 millimeter and 1 millimeter. Each of the first and second reinforcing core members has a coil wound thereon. The first and second head chip members, the shield plate, and the first and second reinforcing core members are bonded together such that the elongated faces of the first and second head chip members are in flush with each other and that the magnetic gaps of the first and second head chip members are aligned to each other.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
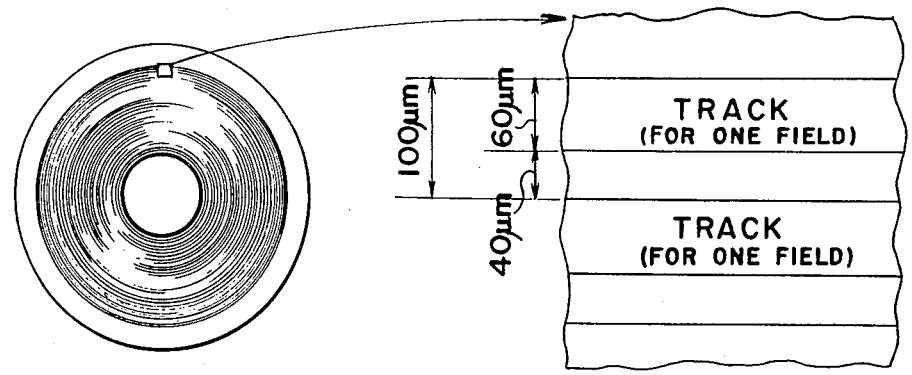
FIG. 1 is a diagrammatic view of a 2-inch disc, and particularly showing the width and spacing of tracks defined thereon.
Figure 2:
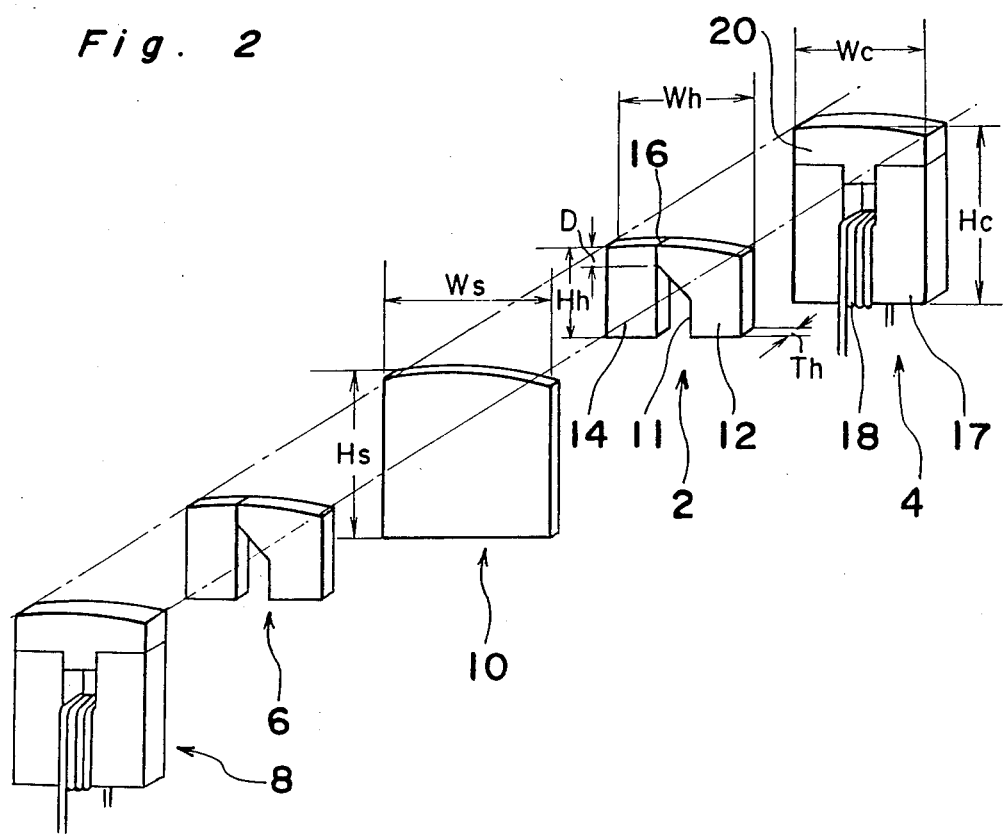
FIG. 2 is an exploded view of a twin head according to a preferred embodiment of the present invention.

Referring to FIG. 2, a twin head for the electronic still camera according to the present invention comprises a first head chip 2, a first reinforcing core 4, a second head chip 6, a second reinforcing core 8 and a shield plate 10.

First head chip 2 is formed by two parts of metal sheets 12 and 14, such as sendust sheets, with a narrow gap 16 formed therebetween by the insertion of non-magnetic material, such as an $SiO_2$ film, by way of, e.g., electron beam deposition. A cut out portion 11 provided between two metal sheets 12 and 14 is formed for inserting a portion of a coil mounted on first reinforcing core 4. The top edge of the head chip formed with the gap is slightly arched for facilitating the smooth contact with the recording medium.

According to the present invention, a width Wh of head chip 2 is between 0.3 millimeter and 1.0 millimeter as determined by the tests carried out by the present inventors, and a thickness Th thereof is 60 micrometers. The tests for determining the width Wh will be described later in connection with FIGS. 7 to 9. A height Hh thereof is 0.5 millimeter, but this may be changed to other size. Also, the gap depth D should not be less than a certain length determined by the speed of abrasion and the accuracy of the finish. For example, in the case where head chip 12 is made of a sendust or an amorphous material, the gap depth D should be about 10–20 micrometers or greater from the practical viewpoint so as to secure a sufficient life time of the head.

First reinforcing core 4 is formed by an U-shaped core member 17 made of a magnetic material, such as a ferrite, a coil 18 wound on U-shaped core member 17 at about the center thereof, and a T-shaped member 20 made of a non-magnetic material, such as a glass, mounted on U-shaped core member 17. The top edge of the reinforcing core mounted with T-shaped member 20 is slightly arched in a manner similar to the head chip. According to the embodiment shown in FIG. 2, the width Wc of the reinforcing core 4 is equal to the width Wh of the head chip 2. Thus, width Wc is between 0.3 millimeter and 1.0 millimeter. The height Hc of reinforcing core 4 is 1.5 millimeters, and this may be changed to other size.

Second head chip 6 and second reinforcing core 8 have the same structure as first head chip 2 and first reinforcing core 4, respectively. Therefore, the description therefore is omitted for the sake of brevity.

Shield plate 10 is formed by a copper, silver or titanium alloy. The top edge of shield plate 10 is slightly arched in a manner similar to the head chip. The width Ws of shield plate 10 is greater than the width Wh of head chip 6, and its height Hs is the same as the height Hc of reinforcing core 4. In the modification, the width Ws may be equal to the width Wh of the head chip.

First head chip 2, first reinforcing core 4, second head chip 6, second reinforcing core 8 and shield plate 10 are bonded together in such a manner that their arched top edges are in flush with each other. Also, the opposite sides of first head chip 2, first reinforcing core 4, second head chip 6 and second reinforcing core 8 are aligned as indicated in FIG. 2 by chain lines.

Figure 3A:
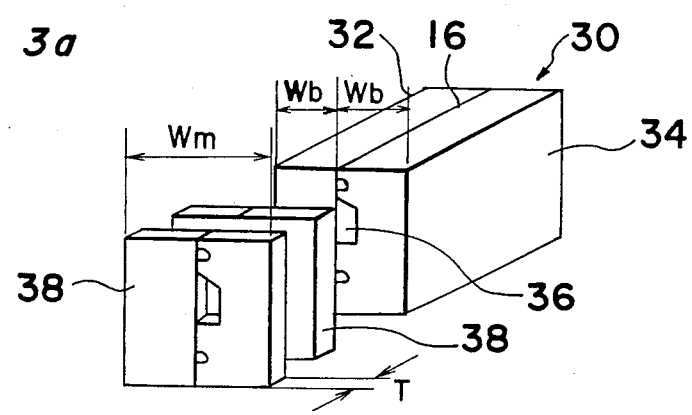
FIG. 3a to 3f are perspective views showing the steps for making the twin head of FIG. 2.
Figure 3B:
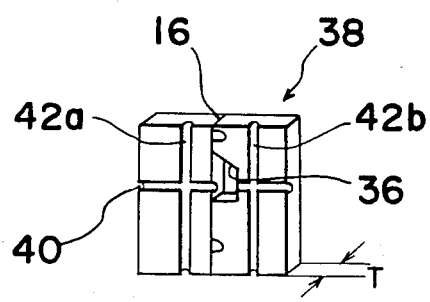
Figure 3B:
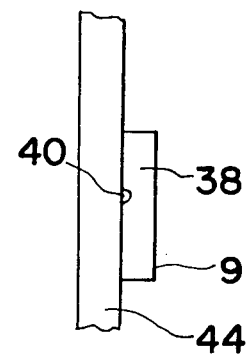
Figure 3C:
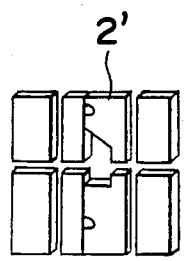
Figure 3D:
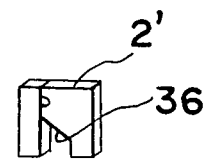
Figure 3E:
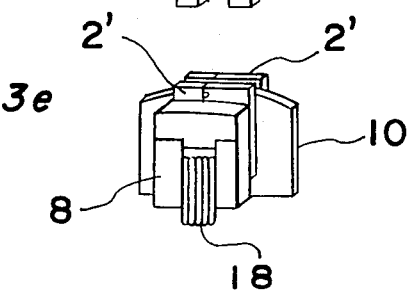
Figure 3F:
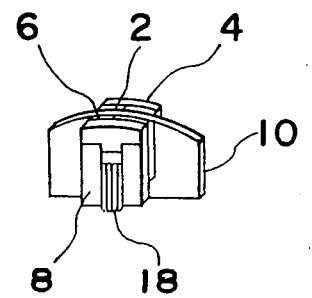
Figure 4:
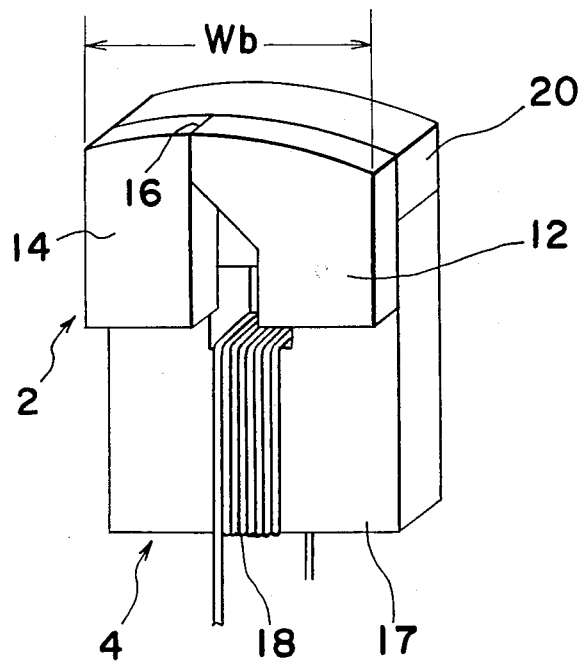
FIG. 4 is a perspective view of one head having a relatively wide width.
Figure 5:
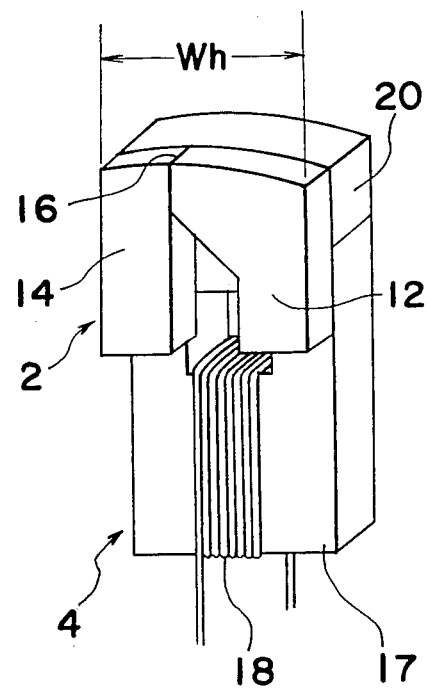
FIG. 5 is a perspective view of one head having a relatively narrow width.
Figure 6:
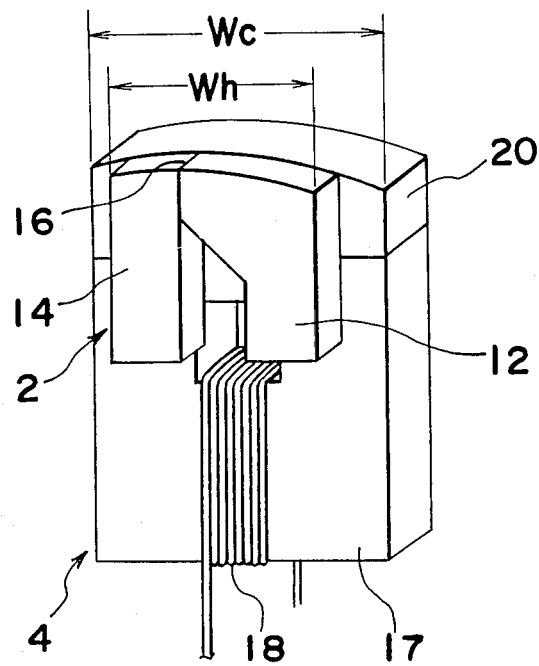
FIG. 6 is a perspective view of one head provided with a head chip having a relatively narrow width.

It is to be noted that in the specification, the head chip bonded with the reinforcing core, such as shown in FIGS. 4, 5 and 6, is referred to as a magnetic head or merely as a head, and the arrangement of two heads with a separator or shield plate provided between two heads, such as shown in FIG. 3f is referred to as the twin head. The operation of the magnetic head is such that, in the recording mode, the picture signal is applied across coil 18. The picture signal is transmitted electro-magnetically through core member 17 and metal sheets 12 and 14, thereby causing magnetic field change at gap 16. The magnetic field change represents the picture signal and is recorded on a recording medium, i.e., the disc. Since the twin head includes two magnetic heads, the picture signal of two fields can be recorded simultaneously upon one rotation of the disc. Generally, one picture is established by one frame containing two fields. In the reproducing mode, the picture signal recorded on the medium is picked up magnetically at the gap and is produced across coil 18 as an electric signal.

Next, the steps for forming the twin head is described.

Referring to FIG. 3a, a pair of blocks 32 and 34 are bonded together to define a mother block 30. Each block is made of metal, such as a sendust, and has a width Wb greater than 1 millimeters. If the width Wb is less than 1 millimeters, there will be a problem such that the block may be so bent to loose the flatness in such a manner that the bonding surface may be curved. Such a bending is due to the difference in the surface tension between the polished surface for bonding the other block and the surface opposite to the polished surface.

Block 34 is previously formed with a opening 36 which will serve as a cut out portion 11. Before bonding the blocks together, a suitable non-magnetic film 16, such as an $SiO_2$ film, is applied, by way of, e.g., electron beam deposition, to the bonding faces to provide a necessary gap between blocks 32 and 34. When the blocks are bonded, the mother block 30 is provided having a a width Wm of more than 2 millimeters. Then, the mother block 30 is sliced into sheets 38 having a thickness T of about 200 micrometers or more.

Then, as shown in FIG. 3b, the sliced sheet 38 is formed, in a known manner, with one horizontal groove 40 traversing the opening 36 and two vertical grooves 42a and 42b. The depth of the grooves is greater than 60 micrometers. It is to be noted that a spacing between grooves 42a and 42b is 0.3–1.0 millimeters with gap 16 located intermediately therebetween.

Then, as shown in FIG. 3b', the sliced sheet 38 is bonded, using a fusible bonding agent, on a substrate 44 with the groove-formed surface facing substrate 44. Then, the sliced sheet 38 is ground on the surface opposite to the groove-formed surface. The grinding is carried out until the thickness T of the sliced sheet 38 becomes 60 micrometers. As the grinding proceeds, grooves 40, 42a and 42b appear, thereby separating the sliced sheet 38 into six pieces, as shown in FIG. 3c. Of the six pieces, a piece indicated as 2', which is referred to as a head element, is used in the further steps. Head element 2' is taken off from substrate 44 using a suitable solvent to remove the bonding agent. In this manner, a number of head elements 2' are prepared.

In the meantime, the reinforcing cores with a straight top edge are prepared. Head element 2' is bonded to the reinforcing core to provide one magnetic head. At this stage, the top edges of the magnetic head is not yet arched. then, two magnetic heads are bonded together with a shield plate 10 positioned therebetween such that the face of head element 2' which is not bonded with the reinforcing core is bonded to the surface of shield plate 10. Accordingly, reinforcing core 4, head element 2', shield plate 10, head element 2' and reinforcing core 4 are bonded together in the named order. When bonding these members, it is necessary to align the gaps 16 of the head elements on opposite sides of shield plate 10. When these members are bonded together, their top edge is polished by way of, e.g., a lapping tape to provide a common arched surface thereby providing a smooth contact between the polished surface and the surface of recording medium, such as the disc surface. In this manner, the twin head is completed.

By the above mentioned steps, a twin head having a high accuracy in various dimensions, such as the width Wh of head chip 2, is produced.

Next, the tests for determining the width Wh will be described.

In the first test, the twin heads having different width W are tested to obtain a relationship between the width W of the twin head and the crosstalk level. The width W of the twin head is changed such that the width Wh of head chips 2 and 6 and the width Wc of reinforcing cores 4 and 8 are changed simultaneously so that head chips 2 and 6 and reinforcing cores 4 and 8 have the same width. For example, to obtain one test result, a twin head defined by two of the magnetic head shown in FIG. 4 is used, and to obtain another test result, a twin head defined by two of the magnetic head with a narrower width, such as shown in FIG. 5, is used. Other sizes, such as the height Hc of the reinforcing core and the height Hh of the head chip, are maintained constant throughout the first test. For example, in the first test, heights are chosen at such amounts that: Hh=0.5 mm and Hc=1.5 mm. Although these figures for Hh and Hc may be changed to other values, they should not be extremely small or otherwise the reproducing efficiency of the magnetic head will be reduced. Furthermore, although the change of these heights Hh and Hc may result in the change of the crosstalk, such a change of the crosstalk is very small that it can be ignored.

Figure 7:
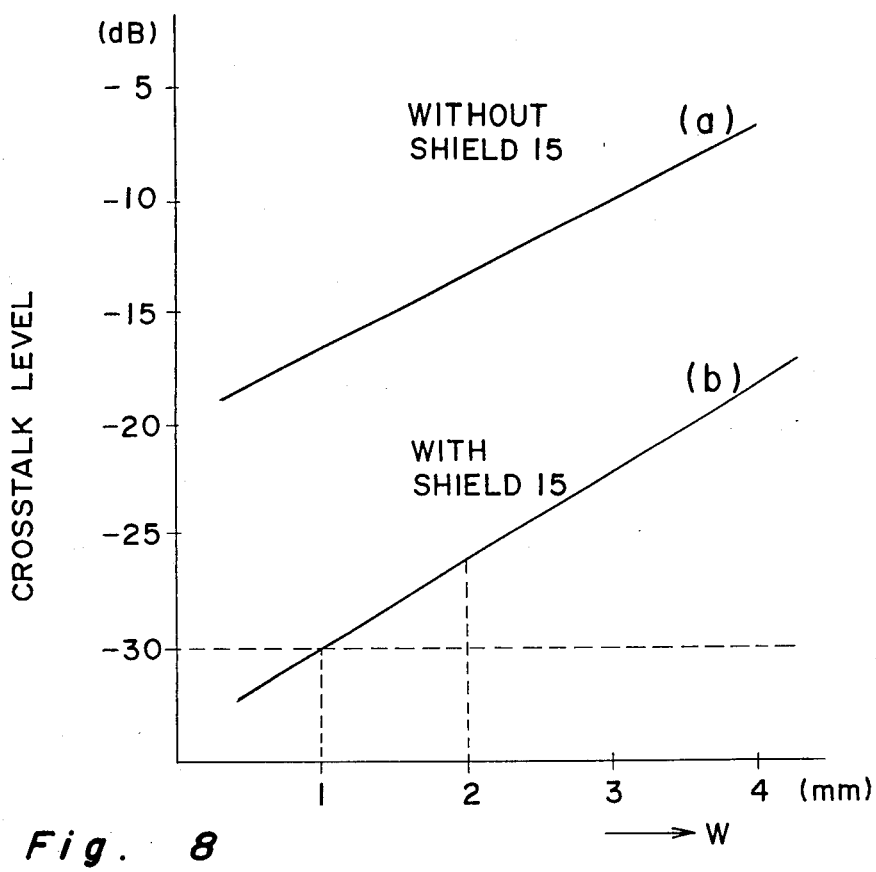
FIG. 7 is a graph showing a relationship between the width of a head and the degree of the crosstalk.

The result of the first test is shown in the graph of FIG. 7, in which line (a) represents twin head without shield plate 10 and line (b) represents twin head with shield plate 10 made of an electrically high conductive material having a resistivity of $2\times10^{-8}$ ohm/meter or less. As apparent from the graph, the unwanted crosstalk can be reduced as the width W becomes small. Also, by the employment of shield plate 10, the crosstalk can be reduced greatly. From the practical viewpoint, it is preferably to reduce the crosstalk level below $-30$ dB so that no influence of the crosstalk appears, without using any correction circuit, on the reproduced picture. This requirement is met when the width W of the twin head (with a shield plate) becomes smaller than 1 millimeter. Although the elimination of the crosstalk can be improved by narrowing the width W, another problem arises when the width W becomes too narrow, as described below.

As the width W becomes narrow, a magnetic resistance of core member 17 and metal sheets 12 and 14 becomes great, thereby making the reproducing efficiency very poor. This will result in the lowering of the carrier-to-noise ration (C/N). Although the C/N, or the reproducing efficiency, can be improved by making the depth D of gap 16 short, the depth D should not be less than a certain length determined by the speed of abrasion and the accuracy of the finish. For example, in the case where head chip 12 is made of a sendust or an amorphous material, the gap depth D should be about 10-20 micrometers or greater from the practical viewpoint so as to secure a sufficient life time of the head.

In the second test, the twin heads having different width W are tested to obtain a relationship between the width W of the twin head and the reproducing efficiency. The width W of the twin head is changed in the same manner as in the first test.

Figure 8:
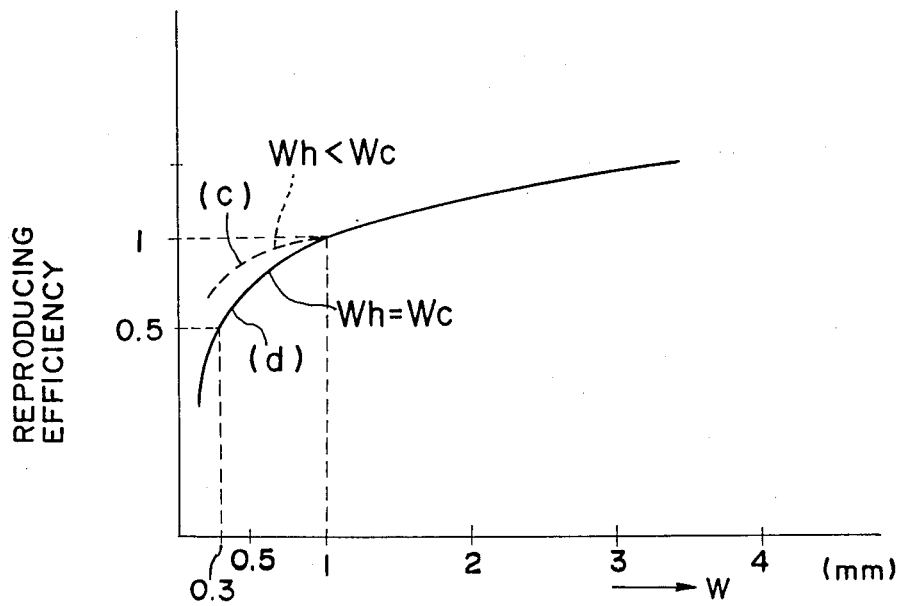
FIG. 8 is a graph showing a relationship between the width of a head and the reproducing efficiency of the head.

The result of the second test is shown in the graph of FIG. 8 by a real line (d). As apparent from the graph, the reproducing efficiency becomes small as the width W becomes small. When the reproducing efficiency of a twin head having width of 1 mm is defined as "1", it has been found that the reproducing efficiency should preferably greater than 0.5. Therefore, from the graph, it is understood that the width W should be greater than 0.3 millimeter.

Thus, from the results of the first and second tests, it is concluded that the width W o f twin head should meet a condition that:

0.3 millimeter $\leq$ W $\leq$ 1 millimeter

In the third test, the twin heads having different width Wh are tested to obtain a relationship between the width Wh and the reproducing efficiency. In the third test, only the width Wh of each of head chips 2 and 6 is changed, such as shown in FIG. 6.

The result of the third test is shown in the graph of FIG. 8 by a dotted line (c). As apparent from the graph, the reproducing efficiency is improved in the case where the width Wh is very small, such as between 0.3 millimeter and 1 millimeter.

A relationship between the width Wh of the head chip and the crosstalk level is the same as line (b) shown in FIG. 7. In this respect, it can be said that the reduction of the crosstalk can be accomplished as long as the width Wh of the head chip is made small.

As understood from the foregoing description, according to the present invention, since the head chip is formed by the steps of forming grooves on one surface of sliced sheet 38 and grinding the other surface of the sliced sheet 38, head chips having a required width can be provided easily with a high accuracy, and without giving any damage to the head gap.

Also, since the twin head according to the present invention has a width between 0.3 millimeter and 1 millimeter, unwanted crosstalk may be eliminated.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A twin head for use in an electronic still camera comprising:
   a shield plate;
   a first head chip member having an elongated face that faces a recording medium and a magnetic gap defined at an intermediate portion of said elongated face, said first head chip having a thickness of about 60 micrometers, the length Wh of said elongated face being such that
   0.3 millimeter $\leq$ Wh $\leq$ 1 millimeter
   a second head chip member having an elongated face that faces a recording medium and a magnetic gap defined at an intermediate portion of said elongated face, said second head chip member having a thickness of about 60 micrometers, the length of Wh of said elongated face being equal to that of said first head chip member;
   a first reinforcing core member having a magnetic portion with a coil opening therein and a non-magnetic portion facing the recording medium, and a coil wound around said coil opening;

a second reinforcing core member having a magnetic portion with a coil opening therein, and a non-magnetic portion facing the recording medium, and a coil wound around said coil opening of said second reinforcing core, wherein each of said first and second reinforcing core members has an elongatede face which is flush with said elongated faces of said first and second head chip members;

said first and second head chip members being provided on opposite sides of said shield plate, said first reinforcing core member being provided on one side of said first head chip member remote from said shield plate, and said second reinforcing core member being provided on one side of said second head chip member remote from said shield plate, such that said elongated faces of said first and second head chip members are flush with each other and that said magnetic gaps of said first and second head chip members are aligned with respect to each other.

2. A twin head as claimed in claim 1, wherein said shield plate has an elongate face which is in flush with said elongated faces of said first and second head chip members.

3. A twin head as claimed in claim 2, wherein said elongated face of said shield plate has a length Ws which is longer than said length Wh such that said elongated face of said shield plate extends outwardly from a space defined between said first and second head chip members.

4. A twin head as climed in claim 2, wherein said elongated face of said shield plate has a length Ws which is eqial to said length Wh such that said elongated face of said shield plate fittingly located in a space defined between said first and second head chip members.

5. A twin head as claimed in claim 1, wherein said elongated faces of said first and second reinforcing core members has a length Wc which is the same as the length Wh of said elongated face of said first and second head chip members.

6. A twin head as claimed in claim 1, wherein said elongated faces of said first and second reinforcing core members has a length Wc which is greater than the length Wh of said elongated face of said first and second head chip members.

7. A twin head as claimed in claim 1, wherein said elongated faces of said first and second head chip members are arched.

8. A twin head for use in an electronic still camera comprising:
a shield plate;
a first head chip member having an elongated face that faces a recording medium with a magnetic gap defined at an intermediate portion of said elongated face and bifurcated legs forming a cut out portion, the length Wh of said elongated face being such that
$0.3 \text{ millimeter} \leqq W \leqq 1 \text{ millimeter}$
a second head chip member having a elongated face that faces a recording medium with a magnetic gap defined at an intermediate portion of said elongated face and bifurcated legs forming a cut out portion, the length Wh of said elongated face being equal to that of said first head chip member;
a first reinforcing core member having a coil wound thereon;
a second reinforcing core member having a coil wound thereon, each of said first and second reinforcing core members including,
 (a) a U-shaped magnetic core member having bifurcated arms;
 (b) a non-magnetic core member extending between said bifurcated arms to define an opening together with said U-shaped magnetic core member and further defining an elongated face which is flush with said elongated faces of said first and second head chip members and forms the only face of the reinforcing core which faces the recording medium; and
 (c) a coil wound on said U-shaped magnetic core member such that a part of said coil extends through said opening;
said first and second head chip members being provided on the opposite sides of said shield plate, said first reinforcing core member being provided on one side of said first head chip member remote from said shield plate, and said second reinforcing core member being provided on one side of said second head chip member remote from said shield plate, such that said elongated faces of said first and second head chip members are flush with each other, and that said magnetic gaps of said first and second head chip members are aligned with each other, such that each of said cut out portions accepts said coils wound on said first and second reinforcing core members, and that said bifurcated legs of said first head chip member are held in contact with said bifurcated arms of said first U-shaped magnetic core member, and said bifurcated legs of said second head chip member are held in contact with said bifurcated arms of said second U-shaped magnetic core member.

* * * * *